United States Patent [19]
Jones et al.

[11] 3,812,952
[45] May 28, 1974

[54] ARTICLE CONVEYING APPARATUS

[75] Inventors: Alan Jones; John Shaw Bustard, both of Westhoughton, near Bolton, England

[73] Assignee: Les Parson & Sons (Engineers) Limited, Burry Port, South Wales, Great Britain

[22] Filed: Jan. 30, 1973

[21] Appl. No.: 328,027

[52] U.S. Cl. .............................................. 198/57
[51] Int. Cl. ............................................. B65g 47/18
[58] Field of Search .......... 148/56, 53, 57, 58, 133; 221/159

[56] References Cited
UNITED STATES PATENTS
| | | | |
|---|---|---|---|
| 808,067 | 12/1905 | Briggs | 198/56 |
| 1,492,760 | 5/1924 | Sproul | 198/133 |
| 2,835,963 | 5/1958 | Drennan | 221/159 |

FOREIGN PATENTS OR APPLICATIONS
| | | | |
|---|---|---|---|
| 1,292,058 | 10/1972 | Great Britain | 198/56 |

*Primary Examiner*—Richard E. Aegerter
*Attorney, Agent, or Firm*—Alexander & Dowell

[57] ABSTRACT

The invention provides an apparatus for feeding onions and other articles from a hopper and two eccentrically mounted rotating rollers between which the articles fall on to two rails along which the onions travel upwardly, the rails being of diminishing height at their upper ends so as to lower the required articles into recesses on a conveyer, while excess onions are lowered on to inverted V-shaped blocks from which they fall into channels that convey them back to the hopper.

7 Claims, 5 Drawing Figures

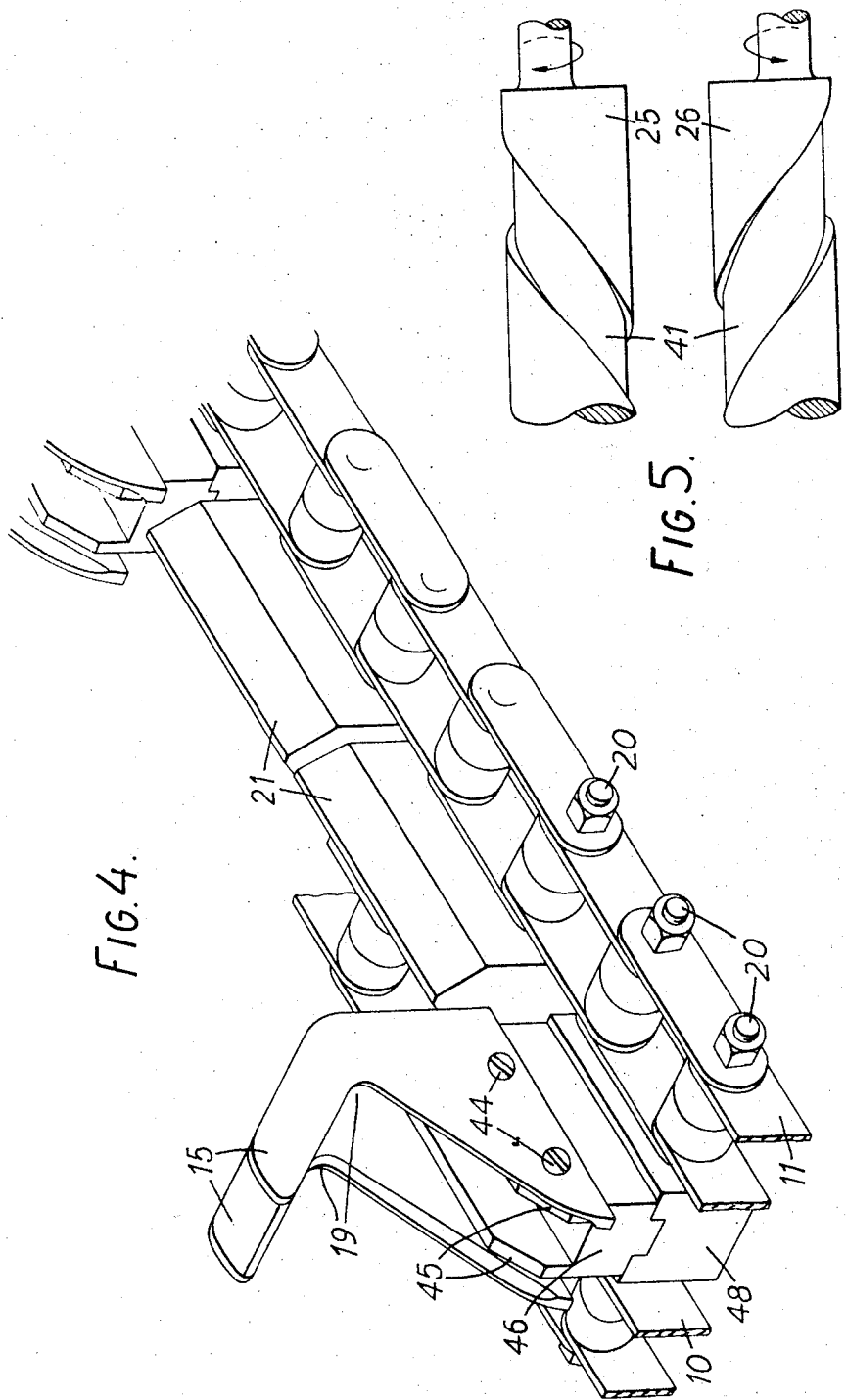

ARTICLE CONVEYING APPARATUS

This invention relates to apparatus for feeding articles from a hopper for counting or examination or to a position in which they are operated upon. The apparatus has been designed in particular for conveying onions one by one from a bulk in a hopper to a topping and tailing skin slitting and skin removing position as described in the specification of our British Pat. No. 1,292,058. While the apparatus of British Pat. No. 1,292,058 has been efficient for pickling onions it is found to be desirable to provide for a more precise control of the conveying of larger onions or other articles.

The apparatus described in British Pat. No. 1,292,058 includes a hopper in the base of which is an opening below which are a pair of rollers extending upwards in the feed direction and spaced apart, rotated, and eccentrically mounted so that their distance apart is continuously increasing and then decreasing; and an endless conveyer carries upstanding article carriers, recessed in their forward surfaces to receive the articles, at intervals and which move along between the rollers, and such apparatus is hereinafter referred to as apparatus of the kind hereinbefore referred to.

According to the present invention apparatus of the kind hereinbefore referred to is provided with a pair of rails extending in the direction of the rollers between them with their upper parts below the upper surfaces of the rollers, said rails being adapted to support the articles above the conveyer while being propelled by the carriers, said rails being of diminishing height beyond the hopper to allow the articles to descend into the recesses in the carriers. The upper surfaces of the rails may be about level with the axes of the rollers. The rails form a sort of smooth guide of rails along which the articles are propelled without damage.

The apparatus may include a sinuous or wavy bar in the hopper above and along the rollers oscillated lengthwise and may carry a block oscillating in a gap at the front lower end of the hopper, this block serving to push the onions into position between the rollers and on to the bars or rails. The sinuous bar and block may have one forward and backward oscillation, and the rollers may have one revolution, for every carrier entering the hopper, the rollers being arranged so that the gap between them begins to diminish as the article reaches the position where the rails begin to diminish in height.

The invention will be further described by way of example with reference to the accompanying diagrammatic drawings wherein.

A pair of endless chains 10, 11 are mounted on sprockets such as 12 and driven at a suitable speed. The upper and lower runs of the chains are inclined to the horizontal and vertical at for example 40° to 60°, e.g., 50°. The sprockets 12 are carried by a frame 13 which also supports a gearbox 14 which provides means for driving the sprockets and other parts.

Figure 2:
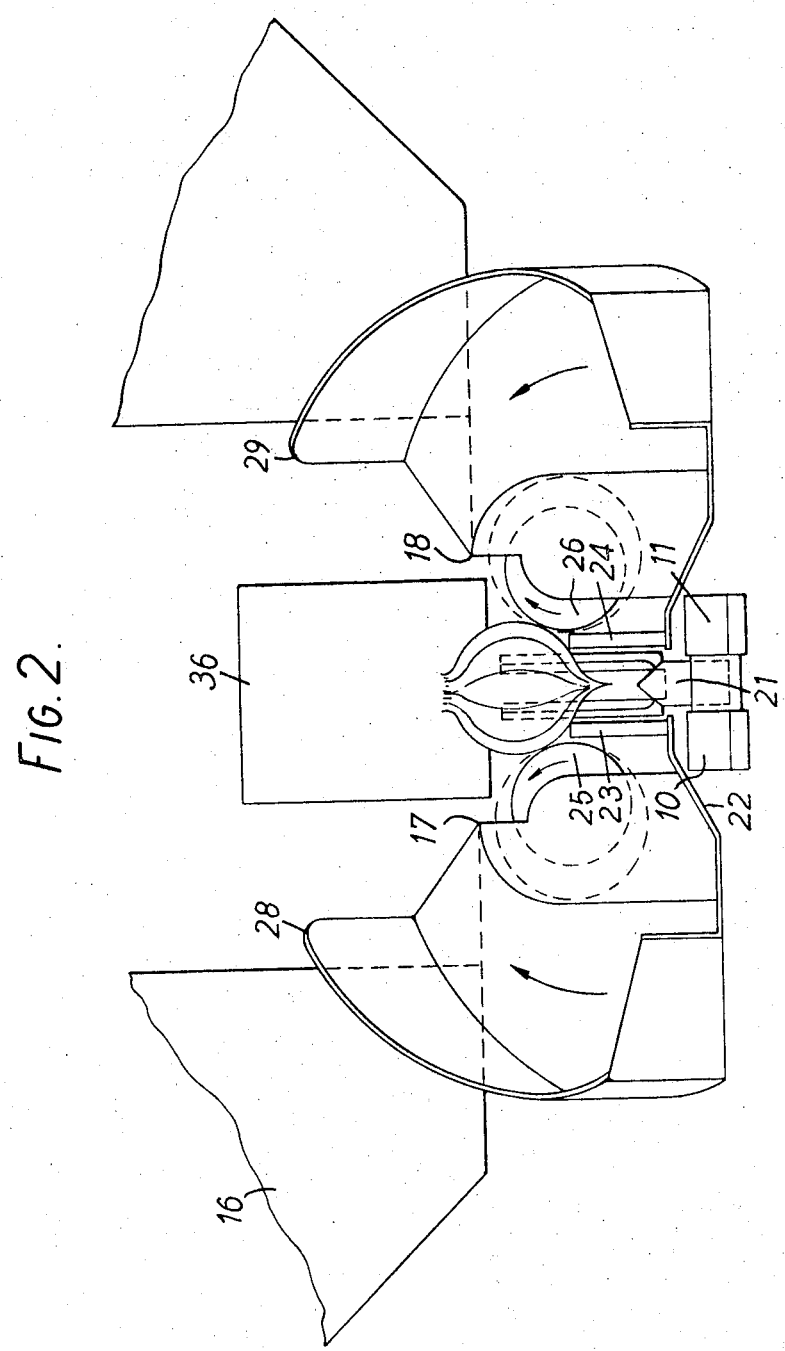
FIG. 2 is a view in the direction of the arrow 2 on FIG. 1, some parts being omitted to show other parts more clearly.
Figure 3:
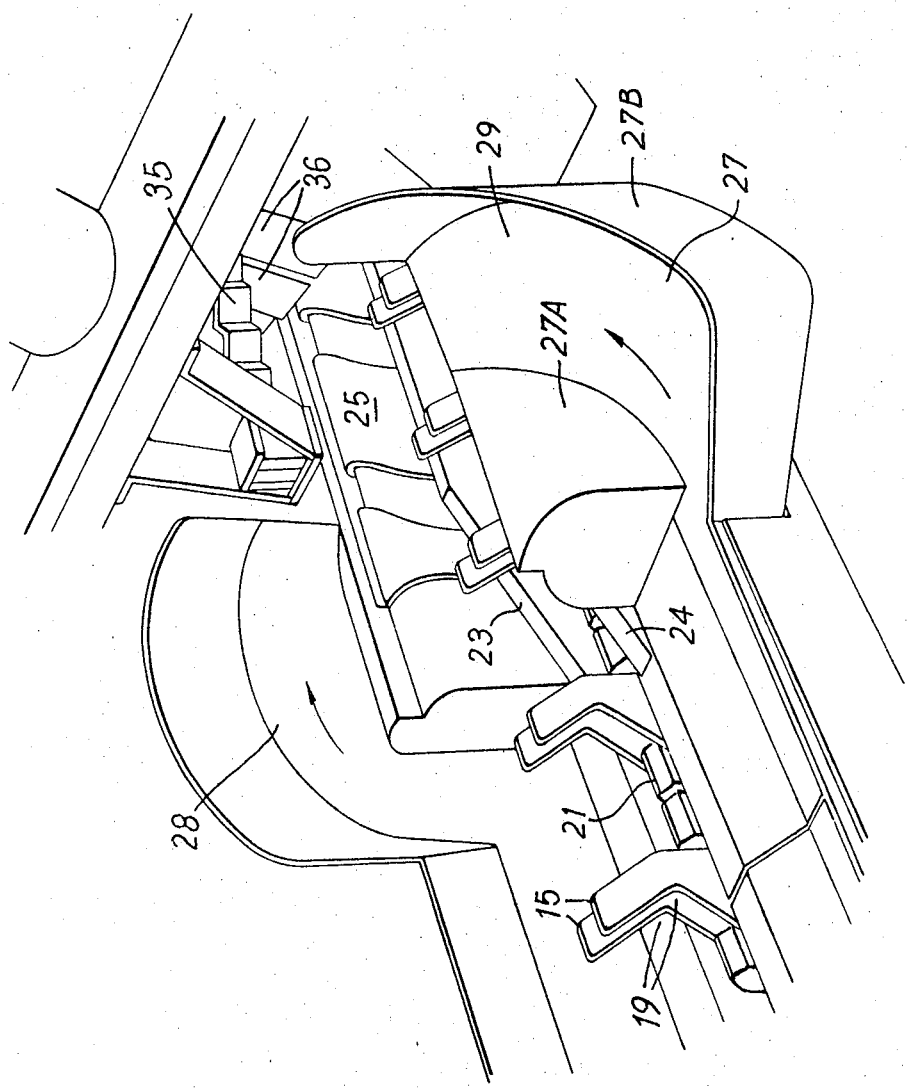
FIG. 3 is a perspective view looking in the direction of the arrow 3 on FIG. 1, and FIGS. 4 and 5 show details to be described.

Mounted over the lower part of the chains is a hopper 16 the base of which is parallel to the chains and above them. The base of the hopper has a slot from 17 to 18 (FIG. 2) extending along the chains and through which onions can gravitate.

The links of the chains carry upstanding article carriers in the form of pairs of hooks or fingers 15 formed with recesses 19 in their forward faces. The fingers of each pair are located side by side and spaced apart to carry an onion upwardly. The fingers of each pair and their adjacent links are fixed rigidly together as by bolts 20 so that they have no relative movement which might cause the onion to be shaken off the pair of fingers. The upper ends of the hooks are about level with or just below the plane of the base of the hopper. The pairs of hooks are fixed to links at intervals leaving some links without fingers and these carry blocks 21 fixed to the adjacent links and extending lengthwise of the chains and between them with their upper edge chamfered to an inverted V-shape at a level below the level of the recesses in the carriers and a small distance above the upper level of the chains. These blocks ensure that excess onions will fall off the conveyer as soon as they move off the rails.

Fixed on the frame are members 22 which form the support for one end of two skid bars or rails 23, 24 which are secured to the gearbox at their other ends. The rails are above the chains and on either side of the blocks 21. The upper edges of these skid bars are at their forward ends parallel to the chains and slightly below the upper ends of the fingers 15. Just beyond the rear or discharge end of the hopper, the skid bars are gradually reduced in height like a ramp on which the articles descend towards the blocks 21 and the chains.

Located on opposite sides of the pair of skid bars are rollers 25, 26 which have their axes parallel to the chains. The rollers are mounted on suitable bearings and driven in opposite directions from the gearbox 14. The rollers are mounted eccentrically so that as they rotate they provide a space between them which alternately increases and decreases in width. The rollers are above the chains and the upper edges of the skid bars 23, 24 along the hopper base are about level with the axes of the rollers. The rollers are below the hopper base 17, 18 and extend beyond the rear or discharge end of the hopper.

If desired fixed blocks may be mounted on opposite sides of the path of the fingers at position D to assist displacing any excess articles.

Figure 1:
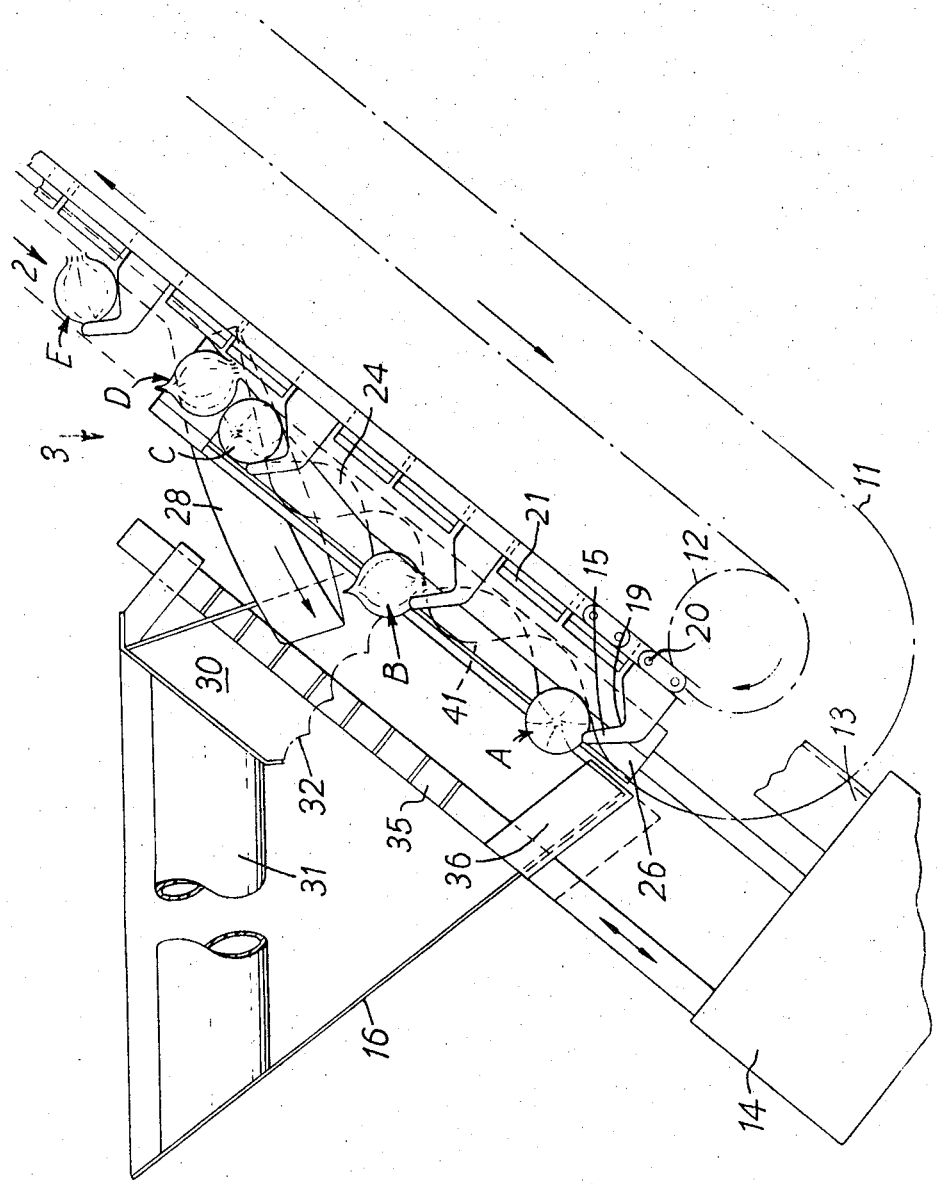
FIG. 1 is a side elevation of the lower parts of an onion feeding apparatus made in accordance with the invention.

Adjacent the position D (FIG. 1) are the entrances of two curved chutes 28, 29 extending rearwardly into the rear part 30 of the hopper. The chutes are formed by a base 27, inner upstanding casing 27A (which covers the bearing of the eccentric rollers) and outer wall 27B. This rear part of the hopper is maintained free from the onions fed in at the top of the hopper by means of tubular and flat baffle plates such as 31 so that the main bulk of onions extends no further back than about as is shown at 32, thus leaving the back part 30 of the hopper empty except for excess onions removed from the chains and returned by rolling down the curved chutes 28, 29. The baffle plates 31 hold the weight of the onions above it and causes an empty space below it so as to minimize the weight of the onions at the conveyer pick up area.

Disposed in the lower part of the hopper some distance above its base is a sinuous or wavy bar 35 located parallel to the chains and reciprocated by cam or eccentric in the gearbox 14 lengthwise to avoid jamming or bridging of the articles. The bar 35 may be omitted if the articles do not tend to be jammed at this position. The front lower part of the hopper is cut away to receive a block 36 which is fixed to the bar 35 and pushes the onions to assist them on to the skid plates 23, 24 The movement of the bar 35 and block 36 are synchronised with the chains so that the bar 35 makes one forward and backward movement for the passage of each pair of fingers 15 so that when a pair of fingers enters the hopper engaging an onion as at position A the block 36 follows closely behind the upper ends of the fingers. The block is then drawn back until it is flush with the front lower wall of the hopper. The bar 35 and block 36 serve to avoid bridging of the onions and to assist the onion into the space between the fingers.

The rollers 25, 26 are synchronised with the chains so that one revolution is made for the passage of one pair of fingers and so that the rollers provide the minimum width between them when an onion is at or near the position (shown by onion B) where the skids 23, 24 commence to reduce in height. The distance between the rollers thus increases as the onion drops between them. The rollers are formed each with a helical groove 41 (FIG. 5) such that its pitch matches that of the carriers 15 and to serve to increase the onion carrying capacity in the area of the carriers in the hopper, i.e., it forms a sort of pocket in front of the carriers which travels up with the carriers.

The return of the excess onions to the rear 30 of the hopper militates against the possibility of their building up a heap at the rear of the hopper as they are displaced by blocks 21 and thereby interfering with the correctly carried onions and provides an auxiliary feed to the carriers.

The excess onions as at position C proceed off the skid bars 23, 24 and rest only on the blocks 21 and fall off into the chutes 28, 29 at about position D. A single onion per pair of fingers as at E is thus carried up to the treatment devices such as topping, tailing, skin slitting and skin removal.

FIG. 4 shows details in perspective of the mounting of the carriers 15 on the conveyer. They are attached by screws 44 to the two flanges 45 of a channel member 46. The member 46 has a tongue and groove connection with a block 48 and is also attached to it by a screw (not shown). Two of the bolts 20 which secure the links of the conveyer together pass through each block 48. Similarly two of the bolts 20 pass through each block 21.

We claim:

1. Apparatus for feeding articles comprising a hopper to contain the articles, an endless conveyer having an upper run and a lower return run, said upper run passing upwardly through the hopper to a position above the hopper, a succession of article carriers mounted at spaced intervals on the conveyer and projecting upwardly from the upper run, said carriers being recessed to receive the articles, the recesses facing forwardly on the upper run, a pair of revolving rollers spaced opposite to each other above the upper run and parallel to the upper run and mounted eccentrically so that a space between them increases and decreases in width to allow articles to fall between the rollers on to the upper run, and a pair of guide rails parallel with said rollers and extending from near the lower end of the rollers towards the upper ends thereof the upper surfaces of said rails diminishing in the direction normal to the axis of the rollers from a position above the lower parts of the recesses to lower the articles into said recesses.

2. Apparatus as claimed in claim 1 wherein the conveyer carries blocks between each successive pair of article carrier positions and below the adjacent recesses in said carriers which are chamfered to present an inverted V-shape between the carriers just below the level of the recesses in the carriers on to which the articles are deposited and which cause excess articles to fall off the conveyer.

3. Apparatus as claimed in claim 1 having two curved chutes leading from the rear end of the rails back to a space in the rear of the hopper for transfer of excess articles falling off the conveyer back into the pick-up area of the hopper.

4. Apparatus as claimed in claim 1 wherein the hopper has a baffle to hold back articles therein so as to leave a space to receive returned excess articles from said chutes and to remove pressure of articles from the pick-up area.

5. Apparatus as claimed in claim 1 having a block oscillating in a gap at the front lower end of the hopper which serves to push the articles into position between the rollers and on to the bars or rails.

6. Apparatus as claimed in claim 1 wherein the rollers have helical grooves therein to militate against bridging of the articles.

7. Apparatus for feeding articles comprising a hopper to contain the articles, an endless conveyer having an upper run and a lower return run, said upper run passing upwardly through the hopper to a position above the hopper, a succession of article carriers mounted at spaced intervals on the conveyer and projecting upwardly from the upper run, said carriers being recessed to receive the articles, the recesses facing forwardly on the upper run, a pair of revolving rollers spaced opposite to each other above the upper run and parallel to the upper run and mounted eccentrically so that a space between them increases and decreases in width to allow articles to fall between the rollers on to the upper run, and a pair of guide rails parallel with said rollers and extending from near the lower end of the rollers towards the upper ends thereof the upper surfaces of said rails diminishing in the direction normal to the axis of the rollers from a position above the lower parts of the recesses to lower the articles into said recesses; blocks carried by the conveyer, said blocks being chamfered at their upper surfaces to present an inverted V-shape between the carriers just below the level of the recesses in the carriers on to which the articles are deposited and which cause excess articles to fall off the conveyer, at least one fixed block at the side of the conveyer to the rear of the rails positioned to displace excess articles, and two curved chutes leading from the rear end of the rails back to a space in the rear of the hopper for transfer of excess articles falling off the conveyer back into the hopper.

* * * * *